(12) United States Patent
Wang et al.

(10) Patent No.: US 11,822,950 B2
(45) Date of Patent: Nov. 21, 2023

(54) CLONELESS SNAPSHOT REVERSION

(71) Applicant: VMware, Inc., Palo Alto, CA (US)

(72) Inventors: Wenguang Wang, Palo Alto, CA (US);
Matt Amdur, Palo Alto, CA (US);
Vamsi Gunturu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 462 days.

(21) Appl. No.: 16/936,846

(22) Filed: Jul. 23, 2020

(65) Prior Publication Data

US 2022/0027185 A1  Jan. 27, 2022

(51) Int. Cl.
*G06F 9/455* (2018.01)
*G06F 16/11* (2019.01)
*G06F 11/14* (2006.01)

(52) U.S. Cl.
CPC ...... *G06F 9/45558* (2013.01); *G06F 11/1469* (2013.01); *G06F 16/128* (2019.01); *G06F 2009/45562* (2013.01); *G06F 2201/84* (2013.01)

(58) Field of Classification Search
CPC ............... G06F 9/45558; G06F 16/128; G06F 11/1469; G06F 2009/45562; G06F 2201/84
See application file for complete search history.

(56) References Cited

U.S. PATENT DOCUMENTS

| | | | |
|---|---|---|---|
| 9,223,659 B1 | 12/2015 | Natanzon et al. | |
| 9,769,250 B2 | 9/2017 | Powers et al. | |
| 11,144,233 B1* | 10/2021 | Singhal | G06F 3/0619 |
| 2015/0142748 A1 | 5/2015 | Gottemukkula et al. | |
| 2016/0110215 A1 | 4/2016 | Bonilla et al. | |
| 2016/0246681 A1* | 8/2016 | Tsirkin | G06F 11/1469 |
| 2018/0276083 A1 | 9/2018 | Mitkar et al. | |
| 2019/0213267 A1* | 7/2019 | Agarwal | G06F 11/1458 |

FOREIGN PATENT DOCUMENTS

CN 101609419 12/2009

* cited by examiner

*Primary Examiner* — Wissam Rashid

(57) ABSTRACT

The present disclosure is related to methods, systems, and machine-readable media for cloneless snapshot reversion. A request can be received to revert to a past snapshot of a virtual computing instance in a snapshot chain of a snapshot tree provided by a software defined data center. A live snapshot can be created at an end of the snapshot chain comprising the past snapshot. An intervening snapshot in the snapshot chain can be indicated as abandoned in a snapshot map associated with the snapshot tree based on the reversion.

14 Claims, 4 Drawing Sheets

CLONELESS SNAPSHOT REVERSION

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

Snapshots and clones may be utilized in a software defined data center to provide backups and/or disaster recovery. For instance, a snapshot can be used to revert to a previous version or state of a VCI. In some approaches, to avoid the loss of intervening state(s) associated with reversion, a clone of the previous version may be created that starts a new chain of snapshots. However, cloning snapshots may be computationally expensive and may lead to performance degradation.

DETAILED DESCRIPTION

Figure 1:
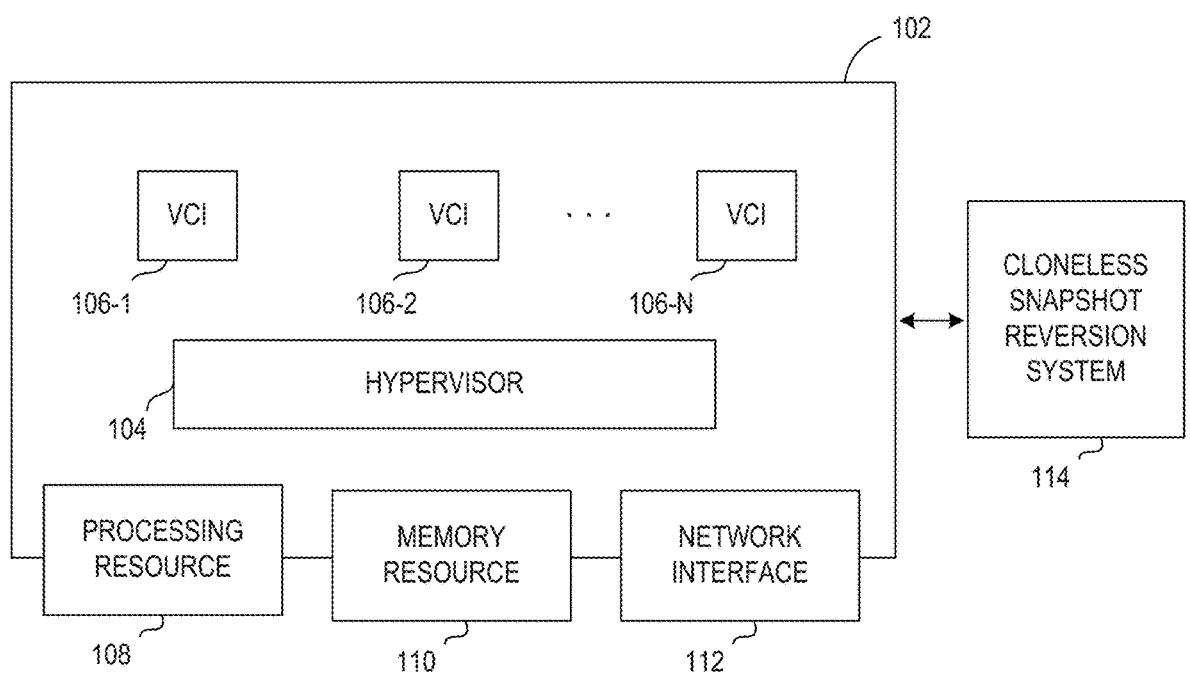
FIG. 1 is a diagram of a host and a system for cloneless snapshot reversion according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

As used herein with respect to VCIs, a "disk" is a representation of memory resources (e.g., memory resources 110 illustrated in FIG. 1) that are used by a VCI. As used herein, "memory resource" includes primary storage (e.g., cache memory, registers, and/or main memory such as random access memory (RAM)) and secondary or other storage (e.g., mass storage such as hard drives, solid state drives, removable media, etc., which may include non-volatile memory). The term "disk" does not imply a single physical memory device. Rather, "disk" implies a portion of memory resources that are being used by a VCI, regardless of how many physical devices provide the memory resources.

A VCI snapshot (referred to herein simply as "snapshot") can preserve the state of a VCI so that it can be reverted to at a later point in time. The snapshot can include memory as well. In some embodiments, a snapshot includes secondary storage, while primary storage is optionally included with the snapshot. A snapshot can store changes from a parent snapshot (e.g., without storing an entire copy of the parent snapshot). A clone VCI (referred to herein simply as "clone") is a copy of an existing VCI. A clone can be created from a snapshot. A clone can start a chain of snapshots.

As referred to herein, a snapshot tree can be represented as a tree of disks and can include both snapshots and clones. The snapshot tree can become complex as the clone levels increase (e.g., the quantity of clones increases), and supporting clones may become computationally expensive as the snapshot tree grows. As previously discussed, a snapshot stores only changes from a previous snapshot rather than an entire copy of the previous snapshot. Thus, each snapshot may have its own unique logical map that includes tuples mapping logical block addresses to physical block addresses. An example tuple may be "L10→P100, N20," where a logical block address, L10, maps to a physical block address, P100, with a total number of blocks, N20. Because snapshots store only changes, if a logical address was not written in a given snapshot, its logical map may make no reference to it In operation, then, when reading a particular logical address, the live (e.g., current) snapshot is initially consulted. If, however, the particular address to be read was never written in the live snapshot, the chain of the live snapshot is consulted in descending (e.g., reverse chronological) order beginning with the snapshot previous to the live snapshot. If the particular address to be read was never written in any snapshots of the live snapshot chain, a snapshot (or snapshot chain) at a higher level in the snapshot tree would be consulted next, and so on.

Reversion is a process whereby a current disk and memory states are discarded and the VCI is reverted to the disk and memory states of a past snapshot in the chain. Such reversion can cause intervening snapshots to be lost. An intervening snapshot, as referred to herein, is a snapshot of a snapshot chain between the live snapshot and the past snapshot to which reversion is made. In some circumstances, it may be desirable to revert to a past snapshot while keeping any intervening snapshots (e.g., keeping as "read only"). In previous approaches, this may be carried out by cloning the past snapshot and creating a new snapshot chain. However, the creation of clones increases the complexity of the tree and can be computationally intensive.

Embodiments of the present disclosure can revert to a past snapshot without discarding intervening snapshots and without creating a clone or altering a height of the snapshot tree. Accordingly, embodiments herein can avoid issues associated with increasing clone levels. For instance, in some embodiments, a flag can be added to a snapshot map that allows reversion without immediate loss of intervening snapshots and without cloning.

A snapshot map stores a list of snapshots of the snapshot tree. A snapshot map may indicate whether a particular snapshot is current (e.g., live) or is marked as deleted. In accordance with the present disclosure, when a reversion to a past snapshot is made, a new snapshot can be created at the end of the snapshot chain that comprises the past snapshot. The new snapshot can accept writes. Stated differently, the new snapshot becomes the current snapshot. In addition, any intervening snapshots can be indicated, in the snapshot map, as abandoned. Then, when a subsequent read request for a logical address is received, embodiments herein can check the snapshot map for snapshots indicated as abandoned and perform a search for the logical address while disregarding any snapshots indicated as abandoned. Stated differently, embodiments herein can check the snapshot map for snapshots indicated as abandoned and perform a search for the logical address while disregarding any tuples that include snapshot identifiers indicated as abandoned.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a host and a system for cloneless snapshot reversion according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a cloneless snapshot reversion system 114. An example of the cloneless snapshot reversion system is illustrated and described in more detail below. In some embodiments, the cloneless snapshot reversion system 114 can be a server, such as a web server.

Figure 2A:
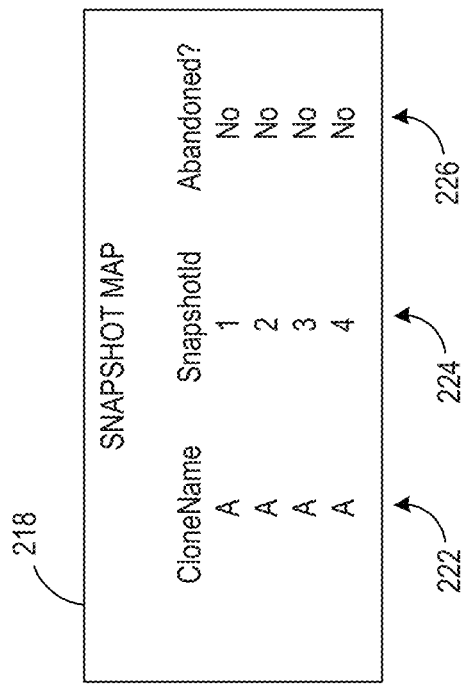
FIG. 2A is a diagram of an example snapshot chain and an example snapshot map 218 according to one or more embodiments of the present disclosure.
Figure 2A:
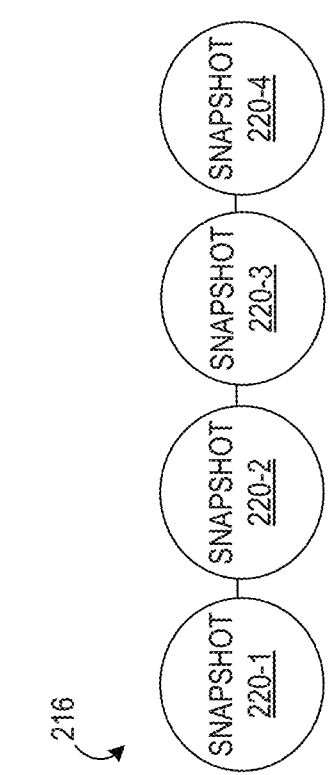
Figure 2B:
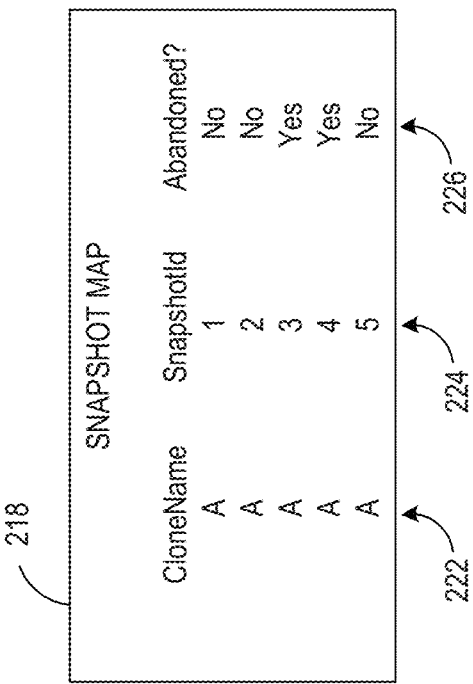
FIG. 2B is a diagram of the example snapshot map and the example snapshot map 218 after reversion according to one or more embodiments of the present disclosure.
Figure 2B:
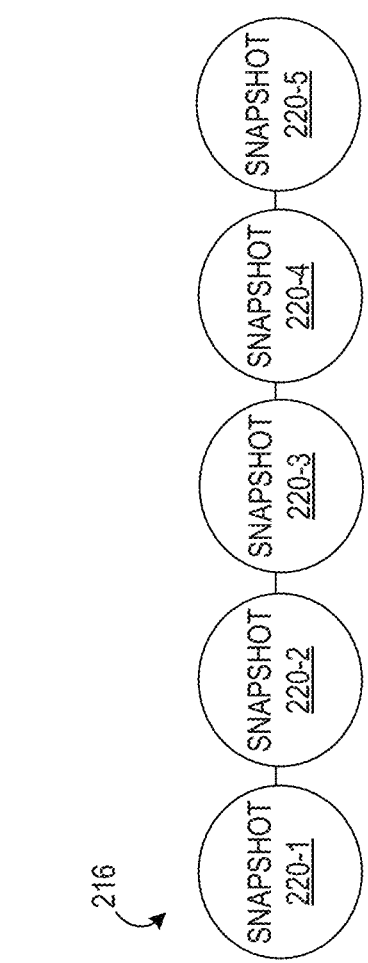

FIG. 2A is a diagram of an example snapshot chain 216 and an example snapshot map 218 according to one or more embodiments of the present disclosure. FIG. 2B is a diagram of the example snapshot map 216 and the example snapshot map 218 after reversion according to one or more embodiments of the present disclosure. FIGS. 2A and 2B may be cumulatively referred to herein as "FIG. 2." The snapshot chain 216 can be associated with a clone of a VCI (e.g., "clone A"). The snapshot chain 216 can be a portion of a snapshot tree, which can include clones and snapshots of the VCI created over a period of time.

As shown in FIG. 2A, the snapshot chain 216 includes a plurality of snapshots: a snapshot 220-1, a snapshot 220-2, a snapshot 220-3, and a snapshot 220-4 (referred to herein as snapshots 1, 2, 3, and 4, respectively). In the example illustrated in FIG. 2A, the snapshot 4 is a live (e.g., current) snapshot. It is noted that a tuple corresponding to a first snapshot in a snapshot chain typically includes a snapshot identifier (ID) of 1 (e.g., "s1"), a tuple corresponding to a second snapshot in a snapshot chain typically includes a snapshot Id of 2 (e.g., "s2"), and so on. Snapshot 1, 2, 3, and 4 can have snapshot Ids of s1, s2, s3, and s4, respectively.

The snapshot map 218 associated with the snapshot chain 216 can include and maintain information associated with each of the snapshots 1, 2, 3, and 4. As shown in the example illustrated in FIG. 2, the snapshot map 218 can comprise information including a name of a clone to which each snapshot belongs (e.g., CloneName 220), an identifier of each snapshot (e.g., snapshotId 224), and an abandoned/not-abandoned status 226 of each snapshot. As shown in the example illustrated in FIG. 2A, each of the snapshots 1, 2, 3, and 4 belongs to clone A and has an abandoned/not-abandoned status 226 of not abandoned. In some embodiments, the abandoned/not abandoned status 226 for each snapshot in the map 218 can comprise one bit of data.

Embodiments herein can receive a request to revert to a past snapshot in the snapshot chain 216. FIG. 2B illustrates a state of the snapshot chain 216 following reversion. In the example illustrated in FIG. 2, a request to revert to snapshot 2 has been received. Responsive to receiving the request, embodiments herein can create a live snapshot (e.g., a new live snapshot) 220-5 (referred to herein as snapshot 5) at an end of the snapshot chain 216. Snapshot 5 can comprise snapshot 2 (e.g., the disk and memory state of snapshot 2). Additionally, embodiments herein can indicate intervening snapshots in the snapshot chain as abandoned in the snapshot map. Reverting to snapshot 2 from the live snapshot 5 causes snapshots 3 and 4 to be intervening snapshots. As shown in FIG. 2B, the abandoned/not-abandoned status 226 of the intervening snapshots 3 and 4 have each been modified to an abandoned status. Additionally, an identifier of snapshot 5 is added to the snapshot map 218 with an abandoned/not-abandoned status 226 of not abandoned.

Figure 3:
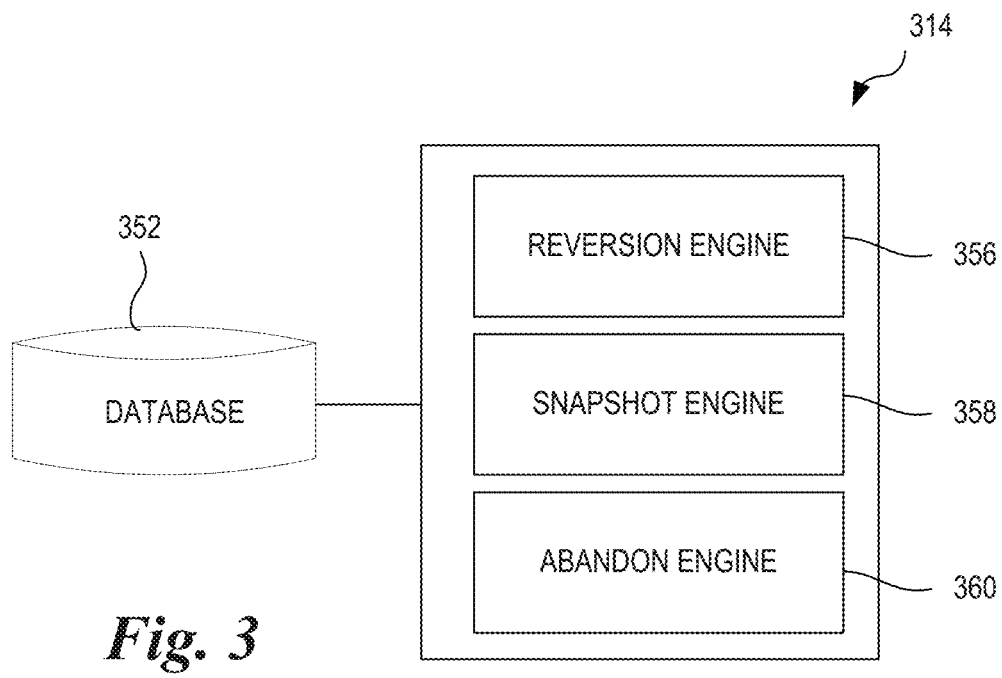
FIG. 3 is a diagram of a system for cloneless snapshot reversion according to one or more embodiments of the present disclosure.

FIG. 3 is a diagram of a system 314 for cloneless snapshot reversion according to one or more embodiments of the present disclosure. The system 314 can include a database 352, a subsystem 354, and/or a number of engines, for example reversion engine 356, snapshot engine 358, and/or abandon engine 360, and can be in communication with the database 352 via a communication link. The system 314 can include additional or fewer engines than illustrated to perform the various functions described herein. The system can represent program instructions and/or hardware of a machine (e.g., machine 462 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the reversion engine 356 can include a combination of hardware and program instructions that is configured to receive a request to revert to a past snapshot of a VCI in a snapshot chain of a snapshot tree provided by a software defined data center. In some embodiments, the snapshot engine 358 can include a combination of hardware and program instructions that is configured to create a live snapshot at an end of the snapshot chain, the live snapshot comprising the past snapshot. In some embodiments, the abandon engine 360 can include a combination of hardware and program instructions that is configured to modify an abandoned/not-abandoned status, in a snapshot map associated with the snapshot tree, of each of a plurality of intervening snapshots in the snapshot chain responsive to the request.

Figure 4:
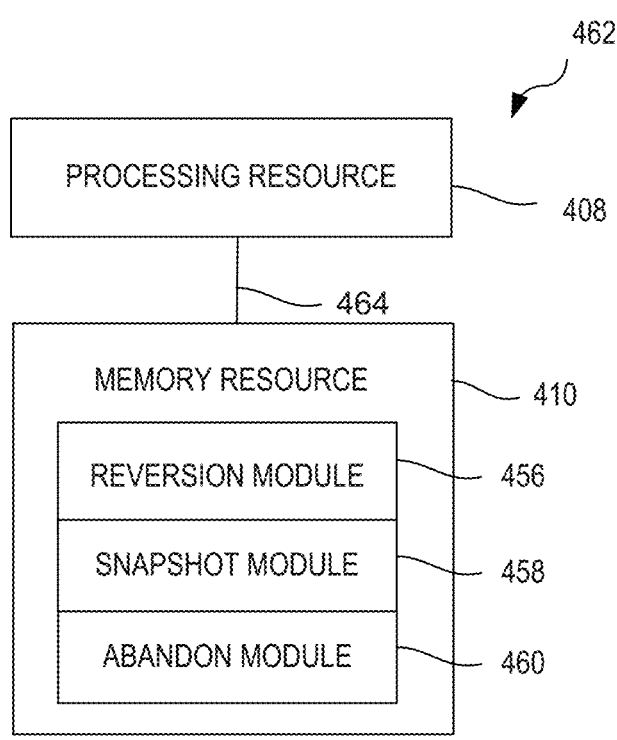
FIG. 4 is a diagram of a machine for cloneless snapshot reversion according to one or more embodiments of the present disclosure.

FIG. 4 is a diagram of a machine for cloneless snapshot reversion according to one or more embodiments of the present disclosure. The machine 462 can utilize software, hardware, firmware, and/or logic to perform a number of functions. The machine 462 can be a combination of hardware and program instructions configured to perform a number of functions (e.g., actions). The hardware, for example, can include a number of processing resources 408 and a number of memory resources 410, such as a machine-readable medium (MRM) or other memory resources 410. The memory resources 410 can be internal and/or external to the machine 462 (e.g., the machine 462 can include internal memory resources and have access to external memory resources). In some embodiments, the machine 462 can be a VCI. The program instructions (e.g., machine-readable instructions (MM)) can include instructions stored on the MRM to implement a particular function (e.g., an action such as creating a live snapshot at an end of a snapshot chain, as described herein). The set of MRI can be executable by one or more of the processing resources 408. The memory resources 410 can be coupled to the machine 462 in a wired and/or wireless manner. For example, the memory resources 410 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 410 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 408 can be coupled to the memory resources 410 via a communication path 464. The communication path 464 can be local or remote to the machine 462. Examples of a local communication path 464 can include an electronic bus internal to a machine, where the memory resources 410 are in communication with the processing resources 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 464 can be such that the memory resources 410 are remote from the processing resources 408, such as in a network connection between the memory resources 410 and the processing resources 408. That is, the communication path 464 can be a network connection. Examples of such a network connection can include a local area network (LAN), wide area network (WAN), personal area network (PAN), and the Internet, among others.

As shown in FIG. 4, the MRI stored in the memory resources 410 can be segmented into a number of modules 456, 458, 460 that when executed by the processing resources 408 can perform a number of functions. As used herein a module includes a set of instructions included to perform a particular task or action. The number of modules 456, 458, 460 can be sub-modules of other modules. For example, the abandon module 460 can be a sub-module of the snapshot module 458 and/or can be contained within a single module. Furthermore, the number of modules 456, 458, 460 can comprise individual modules separate and distinct from one another. Examples are not limited to the specific modules 456, 458, 460 illustrated in FIG. 4.

Each of the number of modules 456, 458, 460 can include program instructions and/or a combination of hardware and program instructions that, when executed by a processing resource 408, can function as a corresponding engine as described with respect to FIG. 3. For example, the reversion module 456 can include program instructions and/or a combination of hardware and program instructions that, when executed by a processing resource 408, can function as the reversion engine 356, though embodiments of the present disclosure are not so limited.

The machine 462 can include a reversion module 456, which can include instructions to receive a request to revert to a past snapshot of a virtual computing instance (VCI) in a snapshot chain of a snapshot tree provided by a software defined data center. The machine 462 can include a snapshot module 458, which can include instructions to create a live snapshot at an end of the snapshot chain comprising the past snapshot. The machine 462 can include an abandon module 460, which can include instructions to indicate an intervening snapshot in the snapshot chain as abandoned in a snapshot map associated with the snapshot tree based on the reversion. The abandon module 460 can add a flag (e.g., "Yes") to the snapshot map indicating the intervening snapshot as abandoned.

After the creation of the new snapshot and the indication of the intervening snapshots as abandoned, a subsequent read request for a logical address corresponding to the VCI can be received. Responsive to the request, embodiments herein can check the snapshot map for snapshots indicated as abandoned and perform a search for the logical address while disregarding any snapshots indicated as abandoned. Stated differently, embodiments herein can check the snapshot map for snapshots indicated as abandoned and perform a search for the logical address while disregarding any tuples that include snapshot identifiers indicated as abandoned. Accordingly, the machine 462 can include a module including instructions to search the snapshot chain (e.g., logical maps of the snapshots in the chain), in descending order, for a tuple including the logical address. In some embodiments, the instructions to search the snapshot chain in descending order include instructions to determine if a particular snapshot is abandoned (e.g., based on the snapshot map), search the particular snapshot for the tuple including the logical address in response to the particular snapshot not being abandoned, and search a next snapshot in response to the particular snapshot being abandoned or in response to not finding the tuple in the particular snapshot.

An example of executable instructions responsive to a read request for a logical address:

```
Read (LBA, latestSnap, numBlks)
{
    curLba = LBA
    while (curLba < LBA + numBlks) {
        lookup <curLba, maxSnapshot> in the Logical Map
        while (true) {
            check SnapshotMap for the found snapshotId
            if (snapshotId is not Abandoned) {
                set foundNumBlks from the tuple found in the Logical
                Map break; // found a valid mapping
            }
            iterate to the previous tuple in the Logical Map
            if (hit the beginning of the tree or out of the LBA range
            "tuple.LBA + tuple.numBlks <= curLBA") {
                // handle reading a hole
                foundNumBlks = LBA + numBlks - curLba;
                PBA = -1; // mark this as a hole
                break;
            }
        }
        foundNumBlks = min (foundNumBlks, LBA + numBlks -
        curLba)
        store the curLba → <PBA, foundNumBlks>
        curLba += foundNumBlks; // prepare for the next loop
    }
}
```

Read requests for intervening snapshots can be processed without consulting the snapshot map for an abandoned/not-abandoned status. Stated differently, embodiments herein can receive, after the indication of the intervening snapshot as abandoned, a read request including an identifier of the intervening snapshot and a logical address corresponding to the VCI and read data from a physical address of the intervening snapshot corresponding to the logical address responsive to receipt of the request.

Snapshots (e.g., intervening snapshots) indicated as abandoned can be deleted from the system that scans each logical map to delete tuples with abandoned snapshots and free the space they point to. Stated differently, any tuple that includes an identifier of any intervening snapshot can be deleted. Deletion may be carried out in a background process. In some embodiments, deletion may be carried out responsive to an indication (e.g., a user indication).

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Figure 5:
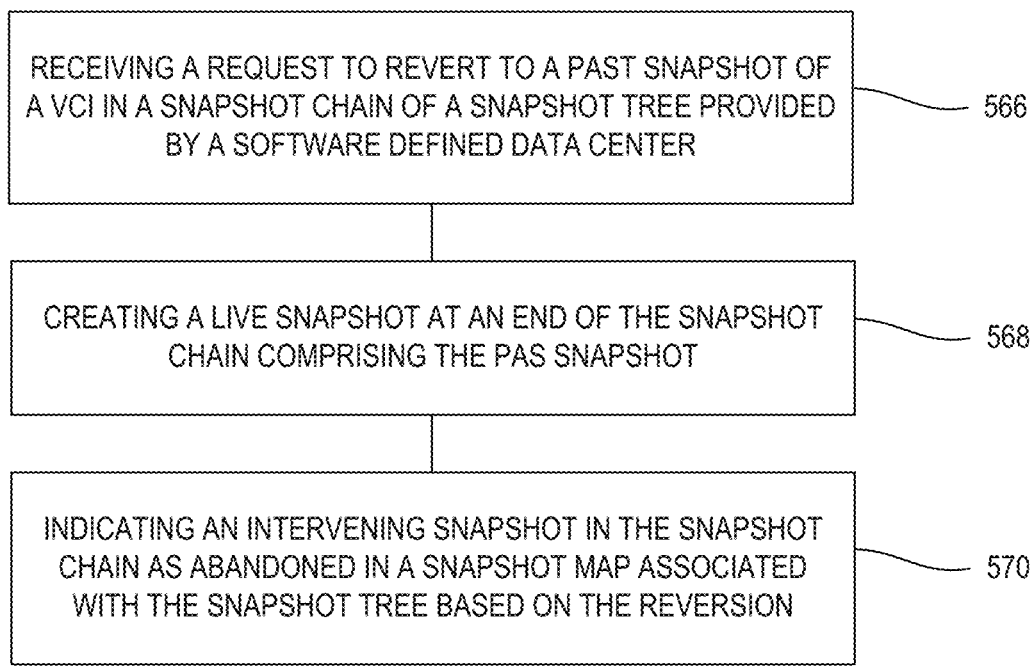
FIG. 5 is a flow chart illustrating one or more methods for cloneless snapshot reversion according to one or more embodiments of the present disclosure.

FIG. 5 is a flow chart illustrating one or more methods for cloneless snapshot reversion according to one or more embodiments of the present disclosure. At 566, the method can include receiving a request to revert to a past snapshot of a virtual computing instance (VCI) in a snapshot chain of a snapshot tree provided by a software defined data center. At 568, the method can include creating a live snapshot at an end of the snapshot chain comprising the past snapshot. At 570, the method can include indicating an intervening snapshot in the snapshot chain as abandoned in a snapshot map associated with the snapshot tree based on the reversion.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
  receiving a request to revert to a past snapshot of a virtual computing instance (VCI) in a snapshot chain of a snapshot tree provided by a software defined data center;
  creating a live snapshot at an end of the snapshot chain comprising the past snapshot;
  indicating an intervening snapshot in the snapshot chain as abandoned via a modification of a status of the intervening snapshot in a snapshot map associated with the snapshot tree based on the reversion;
  receiving, after the indication of the intervening snapshot as abandoned, a read request including a logical address corresponding to the VCI; and
  searching the snapshot chain, in descending order, for a tuple including the logical address.

2. The method of claim 1, wherein the method includes indicating the live snapshot as not abandoned in the snapshot map.

3. The method of claim 1, wherein the method includes indicating all intervening snapshots in the snapshot chain as abandoned in the snapshot map based on the reversion, wherein all intervening snapshots comprise snapshots of the snapshot chain between the live snapshot and the past snapshot.

4. The method of claim 1, wherein searching the snapshot chain in descending order includes:
  determining if a particular snapshot is abandoned;
  searching the particular snapshot for the tuple including the logical address in response to the particular snapshot not being abandoned; and
  searching a next snapshot in response to the particular snapshot being abandoned or in response to not finding the tuple in the particular snapshot.

5. The method of claim 1, wherein the method includes deleting a tuple that includes an identifier of the intervening snapshot.

6. A non-transitory machine-readable medium having instructions stored thereon which, when executed by a processor, cause the processor to:
  receive a request to revert to a past snapshot of a virtual computing instance (VCI) in a snapshot chain of a snapshot tree provided by a software defined data center;
  create a live snapshot at an end of the snapshot chain comprising the past snapshot;
  indicate an intervening snapshot in the snapshot chain as abandoned via a modification of a status of the intervening snapshot in a snapshot map associated with the snapshot tree based on the reversion;
  receive, after the indication of the intervening snapshot as abandoned, a read request including a logical address corresponding to the VCI; and
  search the snapshot chain, in descending order, for a tuple including the logical address.

7. The medium of claim 6, including instructions to indicate the live snapshot as not abandoned in the snapshot map.

8. The medium of claim 6, including instructions to indicate all intervening snapshots in the snapshot chain as abandoned in the snapshot map based on the reversion, wherein all intervening snapshots comprise snapshots of the snapshot chain between the live snapshot and the past snapshot.

9. The medium of claim 6, wherein the instructions to search the snapshot chain in descending order comprise instructions to:
  determine if a particular snapshot is abandoned;
  search the particular snapshot for the tuple including the logical address in response to the particular snapshot not being abandoned; and
  search a next snapshot in response to the particular snapshot being abandoned or in response to not finding the tuple in the particular snapshot.

10. The medium of claim 6, including instructions to delete a tuple that includes an identifier of the intervening snapshot.

11. A system, comprising:
  a processor; and
  a memory having instructions stored thereon which, when executed by the processor, cause the processor to:
    receive a request to revert to a past snapshot of a virtual computing instance (VCI) in a snapshot chain of a snapshot tree provided by a software defined data center;
    create a live snapshot at an end of the snapshot chain comprising the past snapshot;
    indicate an intervening snapshot in the snapshot chain as abandoned via a modification of a status of the intervening snapshot in a snapshot map associated with the snapshot tree based on the reversion;
    receive, after the indication of the intervening snapshot as abandoned, a read request including a logical address corresponding to the VCI; and
    search the snapshot chain, in descending order, for a tuple including the logical address.

12. The system of claim 11, including instructions to indicate the live snapshot as not abandoned in the snapshot map.

13. The system of claim 11, including instructions to indicate all intervening snapshots in the snapshot chain as abandoned in the snapshot map based on the reversion, wherein all intervening snapshots comprise snapshots of the snapshot chain between the live snapshot and the past snapshot.

14. The system of claim 11, including instructions to:
  determine if a particular snapshot is abandoned;

search the particular snapshot for the tuple including the
   logical address in response to the particular snapshot
   not being abandoned; and
search a next snapshot in response to the particular
   snapshot being abandoned or in response to not finding
   the tuple in the particular snapshot.

\* \* \* \* \*